US007315617B2

(12) United States Patent
Shaffer et al.

(10) Patent No.: US 7,315,617 B2
(45) Date of Patent: Jan. 1, 2008

(54) METHOD AND SYSTEM FOR MANAGING CALLS OF AN AUTOMATIC CALL DISTRIBUTOR

(75) Inventors: Shmuel Shaffer, Palo Alto, CA (US); Shantanu Sarkar, San Jose, CA (US); Labhesh Patel, Mountain View, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 700 days.

(21) Appl. No.: 10/649,452

(22) Filed: Aug. 25, 2003

(65) Prior Publication Data

US 2005/0047581 A1 Mar. 3, 2005

(51) Int. Cl.
*H04M 3/00* (2006.01)
*H04M 5/00* (2006.01)

(52) U.S. Cl. ............................. 379/266.1; 379/265.02

(58) Field of Classification Search ............................... 379/265.01–266.1, 309, 210.01
See application file for complete search history.

(56) References Cited

U.S. PATENT DOCUMENTS

| | | | | |
|---|---|---|---|---|
| 5,040,208 A | * | 8/1991 | Jolissaint | 379/210.01 |
| 5,181,236 A | | 1/1993 | LaVallee et al. | 379/67 |
| 5,274,700 A | | 12/1993 | Gechter et al. | 379/211.01 |
| 5,422,942 A | | 6/1995 | Kakwashima | 379/212.01 |
| 5,526,416 A | | 6/1996 | Dezonno et al. | 379/265 |
| 5,590,187 A | | 12/1996 | Greenspan | 379/212.01 |
| 5,703,943 A | | 12/1997 | Otto | 379/265.11 |
| 5,724,420 A | | 3/1998 | Torgrim | 379/372 |
| 5,796,812 A | | 8/1998 | Hanlon et al. | 379/212.01 |
| 5,991,645 A | | 11/1999 | Yuen et al. | 455/568 |
| 6,002,760 A | * | 12/1999 | Gisby | 379/266.01 |
| 6,038,293 A | | 3/2000 | McNerney et al. | 379/88.19 |
| 6,215,865 B1 | | 4/2001 | McCalmont | 379/212.01 |
| 6,295,354 B1 | | 9/2001 | Dezonno | 379/266 |
| 6,301,354 B1 | | 10/2001 | Walker et al. | 379/266.01 |

(Continued)

FOREIGN PATENT DOCUMENTS

WO  WO 99/41895  8/1999

OTHER PUBLICATIONS

International Search Report mailed May 10, 2006 re International Application No. PCT/US04/25782, filed Aug. 10, 2004.

(Continued)

*Primary Examiner*—William J. Deane, Jr.
(74) *Attorney, Agent, or Firm*—Baker Botts L.L.P.

(57) ABSTRACT

A method for managing calls of an automatic call distributor includes receiving a call from a user over a first connection with a first endpoint of the user. The call comprises a request for service. The method includes obtaining presence information of the user and associating the call with the presence information. The method includes placing the call in a queue until a suitable agent becomes available to provide the service to the user. A virtual contact is established to hold a place of the call in an order in the queue if the first connection is terminated. The method also includes establishing a second connection with the user and detecting the presence of the user associated with the second connection. The method includes associating the second connection with the virtual contact using the detected presence of the user.

34 Claims, 2 Drawing Sheets

U.S. PATENT DOCUMENTS

| | | | |
|---|---|---|---|
| 6,314,178 B1 | 11/2001 | Walker et al. | 379/266.01 |
| 6,546,097 B1 | 4/2003 | Peltz | 379/265.07 |
| 6,801,520 B2 * | 10/2004 | Philonenko | 370/351 |
| 2003/0108187 A1 * | 6/2003 | Brown et al. | 379/266.03 |
| 2003/0235287 A1 * | 12/2003 | Margolis | 379/265.01 |

OTHER PUBLICATIONS

U.S. Patent Application entitled, "*Method and System for Utilizing Proxy Designation in a Call System*", inventors Shmuel (nmi) Shaffer, et al, filed Aug. 25, 2003, 43 pages Specification, Claims and Abstract, 2 sheets of drawings.

IBM Technical Disclosure Bulletin, "Computerized Call Return Feature"; vol. 28, No. 11;pp. 4897-4901; IBM Corp. (5 pgs), Apr. 1986.

PCT; International Search Report and Written Opinion; (IS/EPO) for PCT/US2006/033077 (13 pages), Feb. 14, 2007.

* cited by examiner

METHOD AND SYSTEM FOR MANAGING CALLS OF AN AUTOMATIC CALL DISTRIBUTOR

RELATED APPLICATION

This application is related to application Ser. No. 10/649,517, entitled "Method and System for Utilizing Proxy Designation in a Call System," filed on Aug. 25, 2003.

TECHNICAL FIELD OF THE INVENTION

This invention relates in general to automated network communication distribution and, more particularly, to a method and system for managing calls of an automatic call distributor.

BACKGROUND OF THE INVENTION

Automatic call distributors (ACDs) are specialized systems designed to match incoming requests for service, for example a telephone call, a chat or any other multi-media call or contact request with a resource that is able to provide that service, for example a human contact center agent. ACDs generally perform one or more of the following functions: (i) recognize and answer incoming contacts; (ii) review database(s) for instructions on what to do with a particular contact; (iii) use these instructions to identify an appropriate agent and queue the contact, often times providing a prerecorded message; and (iv) connect the contact to an agent as soon as the agent is available.

In current ACD systems, when a caller calls in and all agents are busy, the caller gets queued and has to wait for an available agent. The queue time depends on how soon the agent becomes available and the number of calls already in the queue. At times a caller to a busy call center may receive an outgoing message "We are experiencing a heavy call load. Please hang up and try again later." There is no guarantee that if the user calls later, he will not receive the same message again. This approach wastes resources and time for both the user and the ACD system.

SUMMARY OF THE INVENTION

The present invention provides a method and system for managing calls of an automatic call distributor that substantially eliminates or reduces at least some of the disadvantages and problems associated with previous automatic call distribution methods and systems.

In accordance with a particular embodiment of the present invention, a method for managing calls of an automatic call distributor includes receiving a call from a user over a first connection with a first endpoint of the user. The call comprises a request for service. The method includes obtaining presence information of the user and associating the call with the presence information. The method includes placing the call in a queue until a suitable agent becomes available to provide the service to the user. A virtual contact is established to hold a place of the call in an order in the queue if the first connection is terminated. The method also includes establishing a second connection with the user and detecting the presence of the user associated with the second connection. The method includes associating the second connection with the virtual contact using the detected presence of the user.

The second connection established with the user may be established with the first endpoint or a second endpoint of the user. The method may also include receiving notification from the user to terminate the first connection and hold the place of the call in the order in the queue. The virtual contact may be established after receipt of the notification. The notification may be received through instant messaging (IM), short message service (SMS) text messaging, dual tone multiple frequency (DTMF) signaling or speech recognition. The method may also include querying the user whether the user desires to wait for a suitable agent over the first connection or establish the virtual contact to hold a place of the call in an order in the queue and terminate the first connection.

In accordance with another embodiment, a system for managing calls of an automatic call distributor includes at least one interface port operable to receive a call from a user over a first connection with a first endpoint of the user. The call comprises a request for service. The system includes a queue operable to retain the call until a suitable agent becomes available to provide the service to the user. The system includes a processor operable to establish a virtual contact to hold a place of the call in an order in the queue if the first connection is terminated and establish a second connection with the user. The system also includes a presence server operable to obtain presence information of the user and associate the presence information with the call. The presence server is also operable to detect the presence of the user associated with the second connection. The processor is further operable to associate the second connection with the virtual contact using the detected presence of the user.

Technical advantages of particular embodiments of the present invention include a method and system for managing calls of an ACD that allows users or callers calling ACDs to freely move between endpoints while holding their place in a queue of the ACD and awaiting connection with a suitable agent. The users may terminate an active connection and perform other tasks while their call progresses through to the head of the queue thus saving the users' time.

Another advantage includes the ability to maintain a call's place in an order in the queue in the event that a connection with the ACD is lost or otherwise terminated. The ACD may utilize presence detection to associate another incoming call from the user with the previous call progressing through a queue as a virtual contact. Thus, the presence of a user may be displayed for an agent providing service for the call. Accordingly, additional time and phone connection expenses can be saved.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
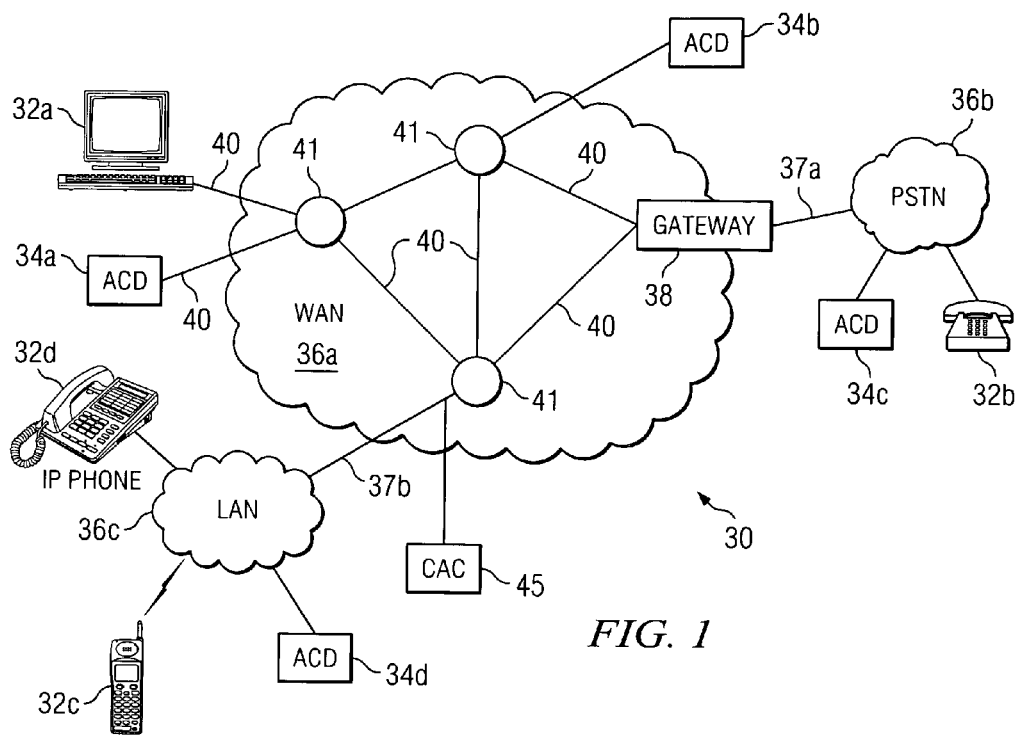
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors (ACDs) 34a-34d, using one or more of communication networks 36a-36c. Automatic call distributors are specialized communication systems designed to route incoming calls to available agents, so that calls are properly and/or evenly distributed. For the purposes of this specification, "automatic call distributor" shall refer to any combination of hardware, software and/or embedded logic which is operable to automatically distribute incoming calls, and "calls" and "contacts" shall include requests for service transmitted using any audio and/or video means, including signals, data or messages transmitted through voice devices, text chat, web sessions, facsimile, instant messaging and e-mail. Thus, references herein to a call shall also refer to a contact and vice versa.

The teachings of the present invention provide a system and method for managing calls of an ACD that allows users or callers calling ACDs 34 to freely move between endpoints while holding their place in a queue of an ACD 34 and awaiting connection with a suitable agent. The users may terminate an active connection and perform other tasks while their call progresses through to the head of the queue. Particular embodiments utilize presence detection in associating a caller over a particular connection with a call placed in the queue.

In the illustrated embodiment, communication network 36a is a wide area network (WAN) that enables communication between a plurality of endpoints 32a-32d and automatic call distributors 34a-34d distributed across multiple cities and geographic regions. In another embodiment, a single, central automatic call distributor may be used, which distributes incoming calls to agents distributed across multiple cities and geographic regions. Communication network 36b is a public switched telephone network (PSTN) and couples endpoint 32b and automatic call distributor 34c with communication network 36a through gateway 38. Communication network 36c is a local area network (LAN), which couples endpoints 32c and 32d and automatic call distributor 34d with communication network 36a. Accordingly, users of endpoints 32a-32d and automatic call distributors 34a-34d can establish communication sessions between and among each network component coupled for communication with one or more of networks 36a-36c. Communication links 37a and 37b couple communication networks 36a and 36b, and communication networks 36a and 36c, respectively. A call admission control (CAC) system 45 may be used to monitor the amount of bandwidth available over link 37b.

Communication network 36a includes a plurality of segments 40 and nodes 41 that couple endpoint 32a with automatic call distributors 34a and 34b, gateway 38, and communication networks 36b-36c. Therefore, a user of endpoint 32a is provided with access to endpoints 32b-32d, and automatic call distributors 34a-34d. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or automatic call distributors 34a-34d.

In a particular embodiment, communication network 36a employs voice communication protocols that allow for the addressing or identification of endpoints, nodes, and/or automatic call distributors coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, automatic call distributors 34a-34b, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, or any other devices capable of performing telephony functions over an IP network.

Components of communication system 30 may utilize session initiation protocol (SIP) technology in the transmission of audio, video or other data across the system. As a result, users of endpoints 32 may be identified by components of system 30 according to a uniform reference identifier (URI), such as a user's e-mail address, or other suitable identifier so that a user may be located, monitored and/or contacted through presence detection technology. The use of presence detection by components of system 30 enable the components to capture information about various communication devices, or endpoints, available to a user and their status, such as whether a cellular phone is switched on or whether a user is logged into a personal computer (PC). The versatility of presence enables it to be used in both IP components, such as IP phone 32d, and other, non-IP components, such as components of PSTN 36b. For example, gateway 38 may comprise a SIP/PSTN gateway so that components coupled to PSTN 36b may utilize features and capabilities available through SIP technology.

It will be recognized by those of ordinary skill in the art that endpoints 32a-32d, automatic call distributors 34a-34d, and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, automatic call distributors, segments, nodes, and gateways, communication system 30 contemplates any number or arrangement of such components for communicating media.

Figure 2:
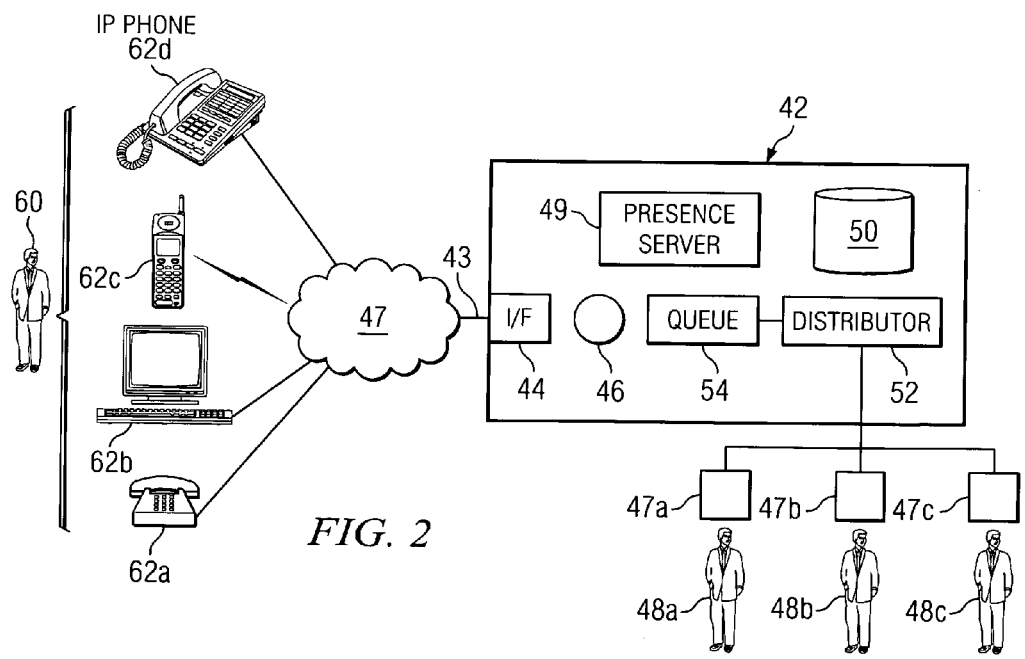
FIG. 2 illustrates an automatic call distributor in more detail, illustrating aspects of a particular embodiment of the present invention.

FIG. 2 illustrates an automatic call distributor 42 in more detail, in accordance with a particular embodiment of the present invention. ACD 42 may include the same components and operate in a similar manner to ACDs 34 of FIG. 1. ACD 42 includes an interface port 44 which couples ACD 42 with a communication network 47, using segment 43. Communication network 47 may comprise one or more networks such as those described with respect to communication system 30 of FIG. 1.

When a call is received at ACD 42, a processor 46 determines which of a plurality of agents 48a-48c should receive the call using endpoints 47a-47c, respectively. Endpoints 47a-47c may comprise PCs, IP phones, cell phones or other devices which may be used by agents to communicate on a call. Processor 46 may use a memory lookup, a database or other memory module, such as memory module 50, in determining which agent should receive the call. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component.

ACD 42 includes a presence server 49 that may be any combination of hardware, software and/or encoded logic. As further discussed below, in one embodiment presence server 49 utilizes SIP technology to detect and/or monitor the presence of a particular user at an endpoint, (for example, at the user's PC, cell phone, IP phone or other device) and associate the call with a user's presence. Other non-SIP presence techniques known in the art may be used in other embodiments. To accomplish such functionality, presence server 49 may have access to any relevant information relating to or associated with the endpoints the user utilizes or accesses to communicate with the ACD.

ACD 42 uses processor 46 to monitor conditions of the ACD, such as the number, type or characteristics of calls in queues 54. It will be recognized by those of ordinary skill in the art that ACD 42 may include any number of processors or memory modules to accomplish the functionality and features described herein. The processors 46, memory modules 50 and/or presence server 49 associated with ACD 42 may be centrally located (local) with respect to one another, or distributed throughout communication network 47.

If a suitable agent is available to receive the incoming call, a distributor 52 of ACD 42 distributes the call to such agent for connection. Such connection may comprise, for example, coupling the user or caller of the call with the suitable agent if the call comprises a voice call. If a suitable agent is not available, the call may be placed into a queue 54 in order to wait for an appropriate agent(s). In this embodiment, ACD 42 has one queue 54; however other embodiments of the present invention may have none or more than one queue 54. The selection of which particular queue to place an incoming call may depend on the type of customer making the call, the type of service requested in the call or any other characteristic or condition relating to the call or ACD 42. While a caller is waiting for an agent, ACD 42 may perform one or more of several functions including data collection from the user, playing of pre-recorded messages or other automated process. As soon as a suitable agent becomes available, distributor 52 distributes the call to the appropriate agent.

In particular situations when a user's or caller's call has been placed into queue 54 and the user may thus be holding for a connection with a suitable agent 48, the user may desire to change his current endpoint connection to continue waiting for connection with a suitable agent. For example, in the illustrated embodiment user 60 has access to endpoints 62a-62d (home phone 62a, PC 62b, cell phone 62c and IP phone 62d). User 60 may be holding from his home phone 62a for connection with an agent 48 and may need to leave his home for a meeting or an appointment. In such case, user 60 may desire to change his current endpoint connection with ACD 42 to his cell phone 62c. User 60 then notifies ACD 42 of this intention. Such notification may be made by dual tone multiple frequency (DTMF) signal, speech recognition, instant messaging (IM), short message service (SMS) text messaging or any other suitable method. In particular embodiments, such notification may be made by user 60 in response to a query sent by ACD 42 asking the user whether he desires to end his current endpoint connection in order to change his endpoint connection or otherwise wait while unconnected on progression of his call through queue 54.

After sending the notification, user 60 may hang up, and ACD 42 will replace the user's call in queue 54 with a virtual contact holding the user's place in the queue. The virtual contact is associated with the presence of the user and takes the place of the user's active connection with the ACD. When user 60 desires to reestablish his presence with ACD 42 on his cell phone 62c or other device, user 60 may log into presence server 49 using his cell 62c or other device. Presence server 49 identifies the presence of user 60 through the cell phone 62c or other device used to log user 60 into the presence server. When a new call arrives from an endpoint and the new call is associated with a user presence of a virtual contact waiting in the queue, ACD 42 recognizes that new call as a continuation of the previous call from user 60. The virtual contact in queue 54 is then replaced with the new real call. In the event that the virtual contact reaches the head of queue 54 before the new call arrives, ACD 42 may keep the virtual contact in queue 54 for a period of time before disposing of it. This period of time may vary in different embodiments, but in particular embodiments the virtual contact may be held at the head of queue 54 for approximately five minutes before ACD 42 disposes of the virtual contact.

In particular embodiments, user 60 may desire to be notified when his virtual contact being held in queue 54 nears or reaches the head of the queue. As discussed above, the virtual contact may be established in queue 54 because user 60 no longer desires to remain on hold with ACD 42. As the virtual call nears or arrives at the head of queue 54, ACD 42 may send a voice call, instant message, SMS text message and/or other type of message to the user's phone or other associated endpoint, such as a PDA or PC, informing user 60 that a suitable agent is ready to handle the user's call. Using the presence information of the user, ACD 42 is able to find the endpoint or device via which the user is available and send the notification to this device. The device to which the message is sent does not have to be the same as the device from which the initial call to the ACD was made. In response, user 60 may call ACD 42 and may be identified by presence server 49 by his presence on the phone or other device as the caller for whom an agent has just freed up. ACD 42 matches user 60 with his virtual call in queue 54 and proceeds to handle the user's real call accordingly. In particular embodiments, ACD 42 may notify the user through IM or SMS text messaging to a cell phone that a suitable agent is about to become available and may invite the user to call into ACD 42. ACD 42 may also notify the user through IM, SMS and other types of messages of the user's place in the queue on a continuing basis so that the user is aware of his call's status or progression through the queue.

It should be understood that a user who makes a call to ACD 42 may cycle through at least four "states" of communication with ACD 42. When the user initially calls the ACD, the user may be in a "call only state" (e.g., a telephony connection is established between the user's endpoint and ACD 42). After logging onto presence server 49 at which time presence information of the user is received by the presence server 49, the user may be in a "call and presence state" (e.g., connection is established and user presence is detected). After a virtual contact has been established in queue 54 and there is no active voice connection between the ACD and the user, the user may be in a "presence only state." While in the presence only state, the user remains logged into the presence server as a virtual contact associated with the user's presence and the initial request for service progresses through the queue. Another state may be achieved by the user once the user logs off of the presence server. In this state, there is no active connection, and the user is not logged into the presence server. However, the virtual contact still progresses through the queue on behalf of the user, and the presence server will know the "identity" of the user. Particular embodiments of the present invention allow users to cycle through these states during the call process, without losing the virtual contact (i.e., position in the queue).

ACD 42 may include and maintain a table containing information regarding the state of queue 54. For example, a table may be maintained that lists the order of real and/or virtual contacts being held by the queue. TABLE 1 below is an example of such a table:

TABLE 1

| Contact ID | User Presence | Active Call ID | Alternate Communication |
|---|---|---|---|
| 1 | $P_1$ | $CID_1$ | $IM_1$ |
| 2 | $P_2$ | None | $SMS_2$ |
| 3 | $P_3$ | $CID_3$ | None |
| 4 | $P_4$ | None | $IM_4$ |
| 5 | $P_5$ | None | None |
| . | . | . | . |
| . | . | . | . |
| . | . | . | . |
| n | $P_n$ | $CID_n$ | $SMS_n$ |

In TABLE 1 above, the "Contact ID" column represents an index of the queue. The "User Presence" column lists the presents of users in their current order awaiting connection with an agent. Such presence may be identified by users' URIs or another suitable identifier. The "Active Call ID" column lists the call ID number associated with those user's currently waiting for an agent on an active connection with the ACD. For those users who may be waiting on an agent through a virtual contact, this column lists "None," because the virtual contact holds the place of the user in the queue when the user is not actively connected with the ACD. If such a user calls into the ACD to hold for an agent on an active connection, then the call ID representing the globally unique call id of said call. The "Alternate Communication" column holds the relevant information regarding the method of notifying the user about the user's place or status in the queue. This information is associated with the presence $P_i$ of user i. When there is no alternate communication path available to a user, the appropriate entry in the table is set to "None."

User 60 may move freely between various endpoints, such as the user's office phone, cell phone and home phone, re-establishing his presence on any desired endpoint. The presence on the new device is recognized by ACD 42, and the user is associated with his virtual contact in the queue. Using this association, the call and the IM or other notification messages may be routed to user 60 while freeing the user to roam freely between his endpoint devices. In one embodiment, the system may send multiple identical notifications to a given user; for example, one may be sent to the user's SMS connection and another to the user's IM connection.

The ability to establish a virtual contact to hold a user's place in the queue and end a real call may be useful in a variety of situations and circumstances. For example, a user and ACD may avoid using phone connection time by waiting on progression through the queue through a virtual contact instead of holding on a live connection with an ACD. This may save any of a number of resources. For example, users may save cell phone usage minutes by not having to wait on an agent while maintaining a connection. Moreover, users and ACD operators may save IP and conventional phone expenses (i.e., minute and connection fees) by not having to stay connected while waiting on connection with a suitable agent.

Another example in which features of particular embodiments may be useful is in the event that a user is holding on a cell phone for an agent, and the user loses cell phone service and the ACD connection (for example, if the user is driving through a tunnel). The ACD may automatically establish a virtual contact in the queue to replace the actual connection with the user. The user may call back when his cell phone service is restored, and the presence server of the ACD may recognize the user's presence and replace the virtual contact with the new real connection so that the user never loses his place in the queue. Alternatively, the ACD may call the user at his office, for example, after he logs into the presence server from his office phone.

Figure 3:
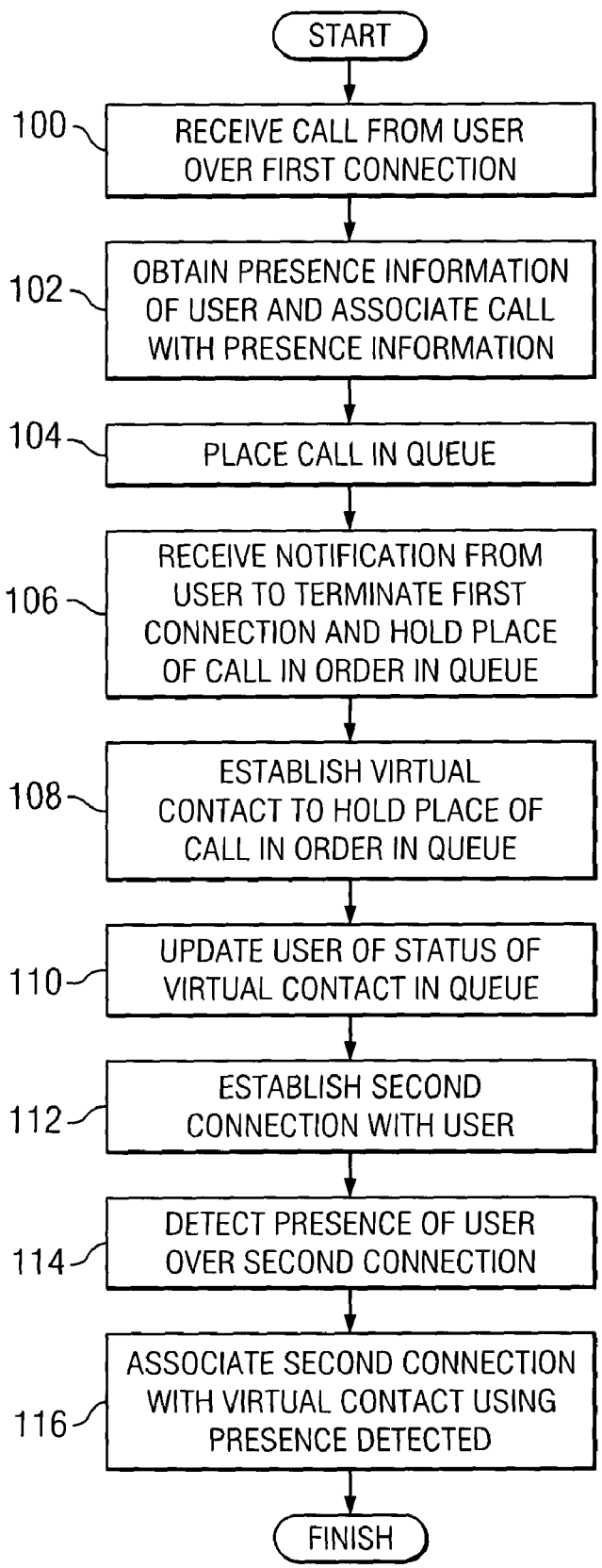
FIG. 3 illustrates a method for managing calls of an automatic call distributor, in accordance with an embodiment of the present invention.

FIG. 3 is a flowchart illustrating a method for managing calls of an automatic call distributor, in accordance with a particular embodiment of the present invention. The method begins at step 100 where a call is received from a user over a first connection. The call may comprise a request for service from a suitable agent and may be received at an interface port of an automatic call distributor. The first connection may be with an endpoint of the user, such as the user's home phone, IP phone, cell phone or PC. At step 102, presence information of the user is obtained, and the call is associated with the presence information. The presence information may comprise, for example, a URI of the user. At step 104, the call is placed in a queue until a suitable agent becomes available to provide the service to the user.

At step 106, notification is received from the user to terminate the first connection and hold the place of the call in the order in the queue. The notification may be received through DTMF signal, e-mail, IM, SMS text messaging, speech recognition or through another suitable method. In particular embodiments, such notification may not be received, for example, if the first connection is terminated by merely losing the connection with the first endpoint (e.g., losing the connection with a cell phone when the cell phone is out of range). In such cases, the call may still be held in the queue. At step 108, a virtual contact is established to hold the place of the call in the order in the queue. The virtual contact represents the presence of the user and includes pertinent and relevant information concerning the user.

At step 110, the user is updated of the status of the virtual contact in the queue. Such update may be accomplished through e-mail, IM, SMS text messaging, phone call or another suitable method. The update may, for example, notify the user that the user's call is approaching the head of the queue. At step 112, a second connection is established with the user. In particular embodiments, the second connection may be established by the user calling back, for example, through the first endpoint or through another endpoint.

At step 114, the presence of the user is detected over the second connection. Such presence detection may be accomplished by a presence server associating a GUID of the endpoint connected over the second connection with a URI of the user. At step 116, the second connection is associated with the virtual contact using the detected presence of the user, since the virtual contact represents a call made by the particular user who made the initial request for service.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic contact distributor 42, these elements may be combined, rearranged or positioned in order to accommodate particular routing architectures or needs. In addition, any of these elements may be provided as separate external components to communication system 30, automatic contact distributor 42 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for managing calls of an automatic call distributor, comprising:
   receiving a call from a user over a first connection with a first endpoint of the user, the call comprising a request for service;
   obtaining presence information of the user and associating the call with the presence information;
   placing the call in a queue until a suitable agent becomes available to provide the service to the user;
   establishing a virtual contact to hold a place of the call in an order in the queue if the first connection is terminated;
   receiving a second call from the user over a second connection;
   detecting the presence of the user associated with the second connection; and
   associating the second connection with the virtual contact using the detected presence of the user.

2. The method of claim 1, wherein receiving a second call from the user over a second connection comprises receiving a second call from the user over a second connection with a second endpoint of the user.

3. The method of claim 1, wherein the virtual contact is established after termination of the first connection, wherein the virtual contact comprises information regarding the presence of the user.

4. The method of claim 1, further comprising:
   receiving notification from the user to terminate the first connection and hold the place of the call in the order in the queue; and
   wherein the virtual contact is established after receipt of the notification.

5. The method of claim 4, wherein the notification is received through instant messaging (IM).

6. The method of claim 4, wherein the notification is received through short message service (SMS) text messaging.

7. The method of claim 4, wherein the notification is received through dual tone multiple frequency (DTMF) signaling.

8. The method of claim 4, wherein the notification is received through speech recognition.

9. The method of claim 1, further comprising updating the user of a status of the virtual contact in the queue.

10. The method of claim 9, wherein updating the user of a status of the virtual contact in the queue comprises updating the user of the status through instant messaging.

11. The method of claim 9, wherein updating the user of a status of the virtual contact in the queue comprises updating the user of the status through short message service text messaging.

12. The method of claim 1, further comprising querying the user whether the user desires to wait for a suitable agent over the first connection or establish the virtual contact to hold a place of the call in an order in the queue and terminate the first connection.

13. A system for managing calls of an automatic call distributor, comprising:
at least one interface port operable to receive a call from a user over a first connection with a first endpoint of the user, the call comprising a request for service;
a queue operable to retain the call until a suitable agent becomes available to provide the service to the user;
a processor operable to:
establish a virtual contact to hold a place of the call in an order in the queue if the first connection is terminated; and
receive a second call from the user over a second connection;
a presence server operable to:
obtain presence information of the user and associate the call with the presence information; and
detect the presence of the user associated with the second connection; and
the processor being further operable to associate the second connection with the virtual contact using the detected presence of the user.

14. The system of claim 13, wherein the processor is operable to receive the second call from the user over a second connection with a second endpoint of the user.

15. The system of claim 13, wherein the processor is operable to establish the virtual contact after termination of the first connection, wherein the virtual contact comprises information regarding the presence of the user.

16. The system of claim 13, wherein:
the at least one interface port is further operable to receive notification from the user to terminate the first connection and hold the place of the call in the order in the queue; and
the processor is operable to establish the virtual contact after receipt of the notification.

17. The system of claim 16, wherein the notification is received through instant messaging (IM).

18. The system of claim 16, wherein the notification is received through short message service (SMS) text messaging.

19. The system of claim 16, wherein the notification is received through dual tone multiple frequency (DTMF) signaling.

20. The system of claim 16, wherein the notification is received through speech recognition.

21. The system of claim 13, wherein the processor is further operable to update the user of a status of the virtual contact in the queue.

22. The system of claim 21, wherein the processor is further operable to update the user of the status through instant messaging.

23. The system of claim 21, wherein the processor is further operable to update the user of the status through short message service text messaging.

24. The system of claim 13, wherein the processor is further operable to query the user whether the user desires to wait for a suitable agent over the first connection or establish the virtual contact to hold a place of the call in an order in the queue and terminate the first connection.

25. A system for managing calls of an automatic call distributor, comprising:
means for receiving a call from a user over a first connection with a first endpoint of the user, the call comprising a request for service;
means for obtaining presence information of the user and associating the call with the presence information;
means for placing the call in a queue until a suitable agent becomes available to provide the service to the user;
means for establishing a virtual contact to hold a place of the call in an order in the queue if the first connection is terminated;
means for receiving a second call from the user over a second connection;
means for detecting the presence of the user associated with the second connection; and
means for associating the second connection with the virtual contact using the detected presence of the user.

26. The system of claim 25, wherein the virtual contact is established after termination of the first connection, wherein the virtual contact comprises information regarding the presence of the user.

27. The system of claim 25, further comprising:
means for receiving notification from the user to terminate the first connection and hold the place of the call in the order in the queue; and
wherein the virtual contact is established after receipt of the notification.

28. The system of claim 25, further comprising means for updating the user of a status of the virtual contact in the queue.

29. The system of claim 25, further comprising means for querying the user whether the user desires to wait for a suitable agent over the first connection or establish the virtual contact to hold a place of the call in an order in the queue and terminate the first connection.

30. A computer program comprising software embodied in a computer readable medium, the computer readable medium comprising code operable to:
receive a call from a user over a first connection with a first endpoint of the user, the call comprising a request for service;
obtain presence information of the user and associate the call with the presence information;
place the call in a queue until a suitable agent becomes available to provide the service to the user;
establish a virtual contact to hold a place of the call in an order in the queue if the first connection is terminated;
receive a second call from the user over a second connection;
detect the presence of the user associated with the second connection; and
associate the second connection with the virtual contact using the detected presence of the user.

31. The medium of claim 30, wherein the virtual contact is established after termination of the first connection, wherein the virtual contact comprises information regarding the presence of the user.

32. The medium of claim 30, wherein:
the code is further operable to receive notification from the user to terminate the first connection and hold the place of the call in the order in the queue; and
the virtual contact is established after receipt of the notification.

33. The medium of claim 30, wherein the code is further operable to update the user of a status of the virtual contact in the queue.

34. The medium of claim 30, wherein the code is further operable to query the user whether the user desires to wait for a suitable agent over the first connection or establish the virtual contact to hold a place of the call in an order in the queue and terminate the first connection.

* * * * *